United States Patent [19]

Reichardt et al.

[11] Patent Number: 5,370,544
[45] Date of Patent: Dec. 6, 1994

[54] CHIP CARD READER WITH AN END POSTITION SWITCH

[75] Inventors: Manfred Reichardt, Weinsberg; Robert Bleier, Untergruppenbach, both of Germany

[73] Assignee: Amphenol Tuchel Electronics GmbH, Germany

[21] Appl. No.: 191,938

[22] Filed: Feb. 4, 1994

Related U.S. Application Data

[63] Continuation of Ser. No. 975,082, Nov. 12, 1992.

[30] Foreign Application Priority Data

Nov. 12, 1991 [DE] Germany ............................. 4137209
Feb. 21, 1992 [DE] Germany ............................. 4205359
Apr. 10, 1992 [DE] Germany ............................. 4212150

[51] Int. Cl.$^5$ .................................................. H01R 13/703
[52] U.S. Cl. ............................................. 439/188; 235/441
[58] Field of Search ............... 439/188; 235/441, 475, 235/479, 485, 486, 492; 200/51.09, 51.1

[56] References Cited

U.S. PATENT DOCUMENTS

4,900,273 12/1990 Pernet ................................. 439/630
5,013,255 5/1991 Juret et al. ........................ 439/188

FOREIGN PATENT DOCUMENTS

0366513 5/1990 European Pat. Off. .
3931506 4/1991 Germany .

*Primary Examiner*—Neil Abrams
*Attorney, Agent, or Firm*—Bacon & Thomas

[57] ABSTRACT

A chip card reader includes a frame, reading contact elements, and an end position switch which includes two switching contact elements arranged to either close or open upon reaching of the reading position by a chip card. The contact elements are identical in both the arrangement in which the elements open to indicate reaching of the reading position by the chip card and the arrangement in which the elements close to indicate reaching of the reading position by the chip card. The frames may also be identical in the opener arrangement and the closer arrangement.

9 Claims, 15 Drawing Sheets

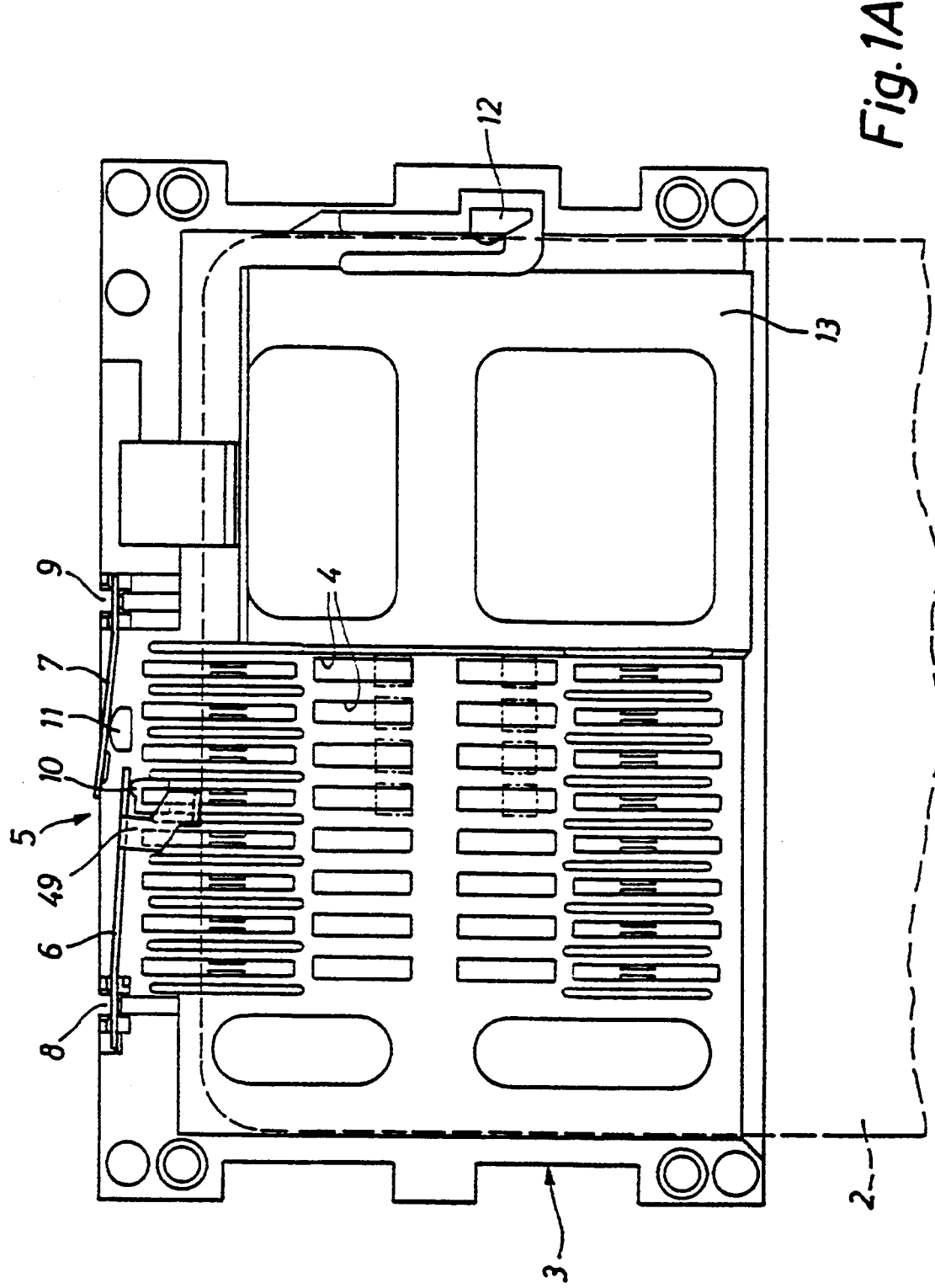

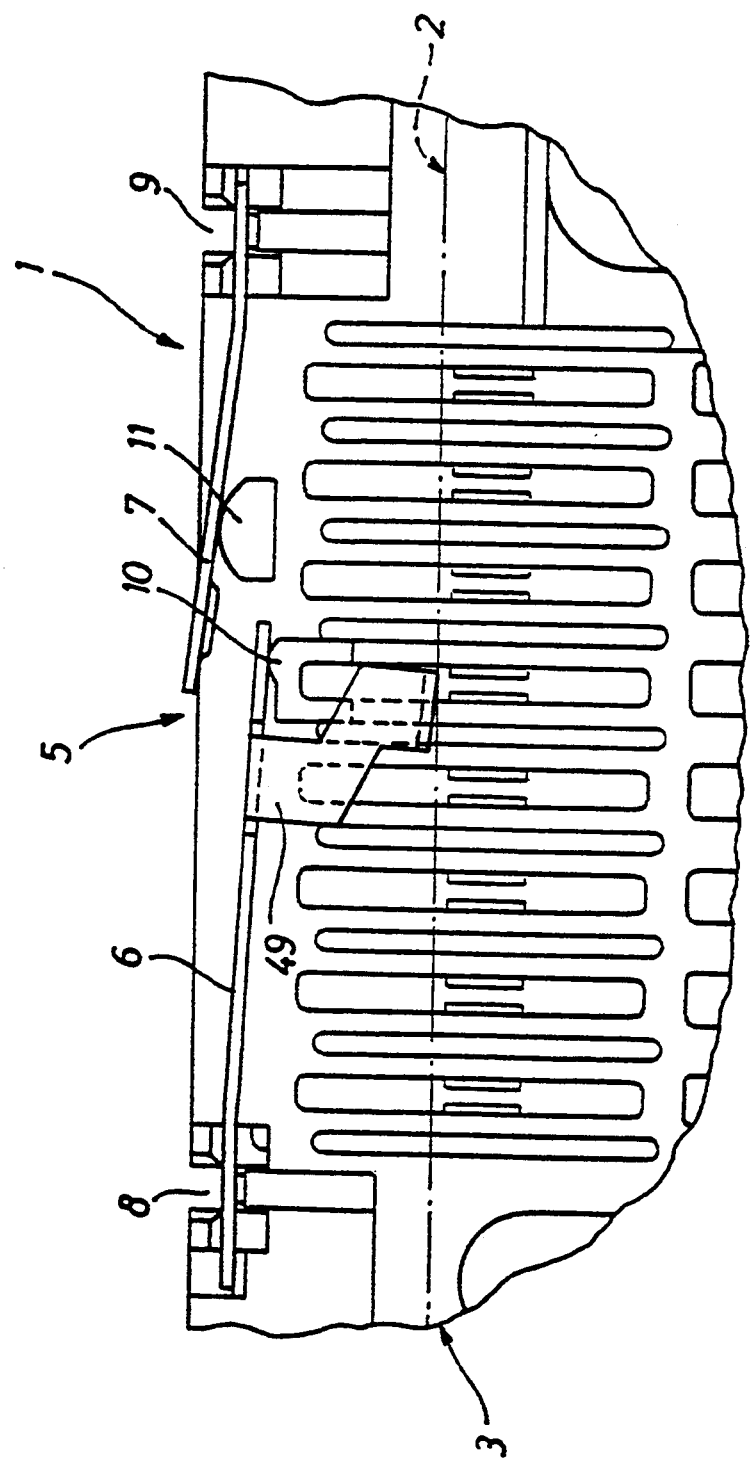

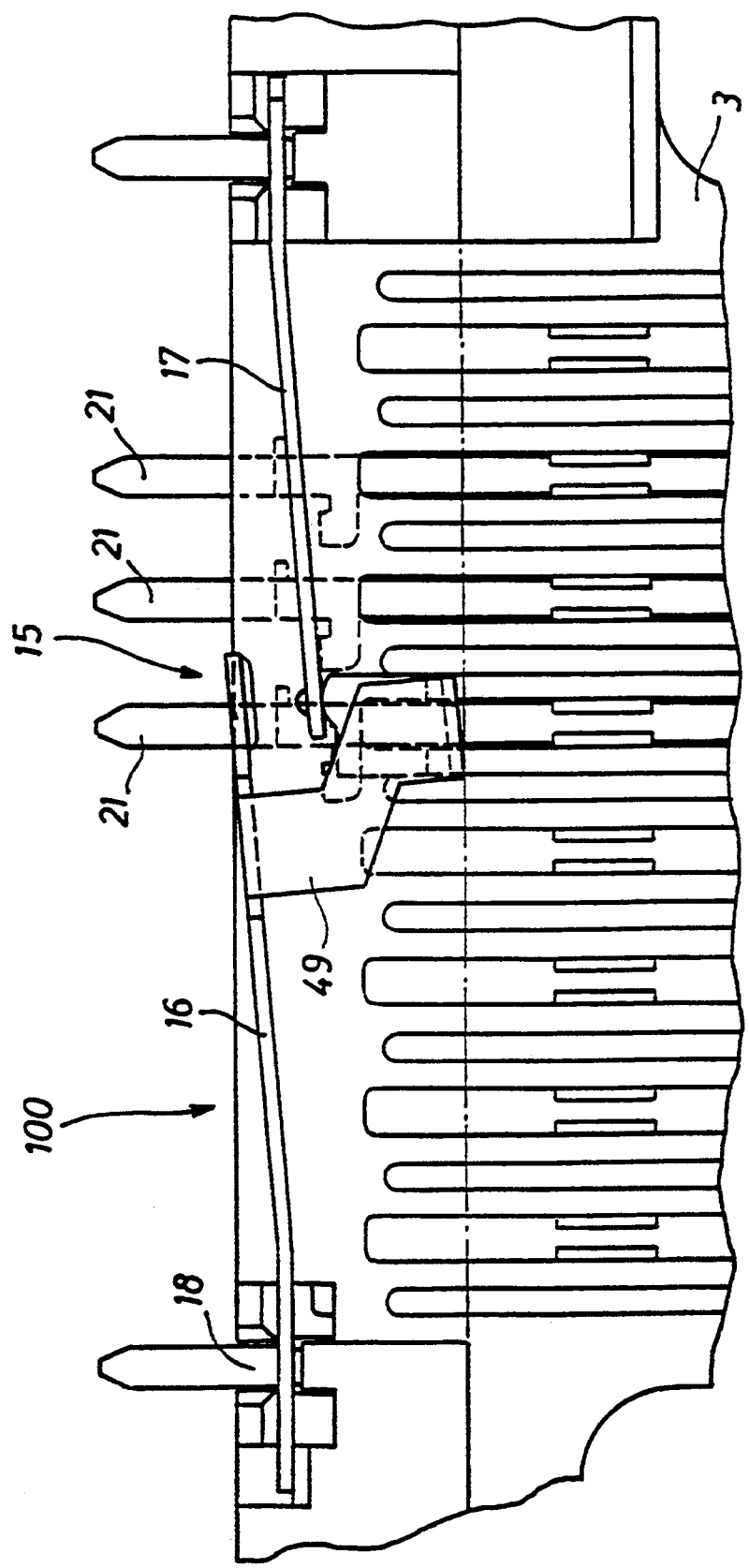

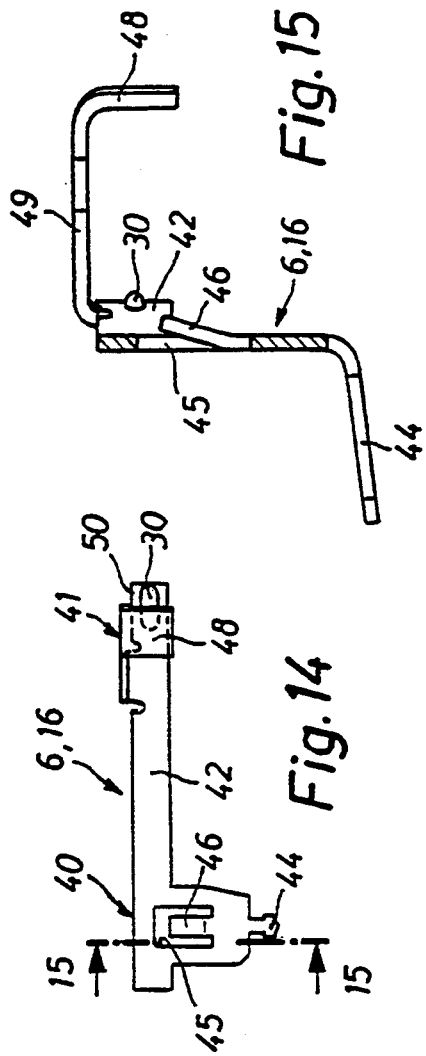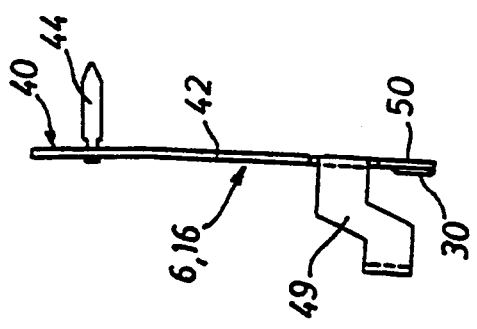

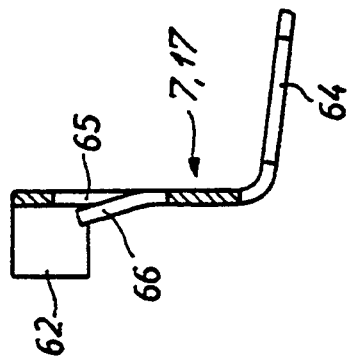
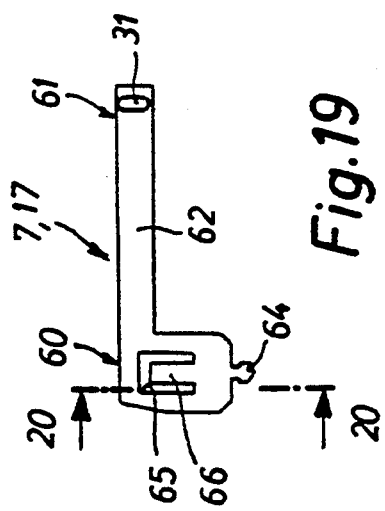
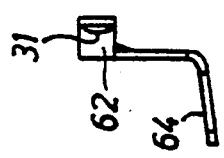
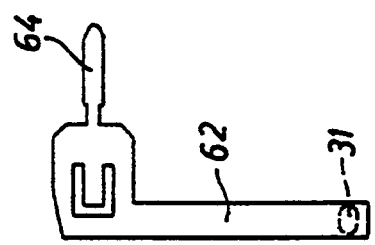
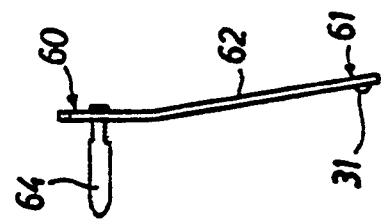

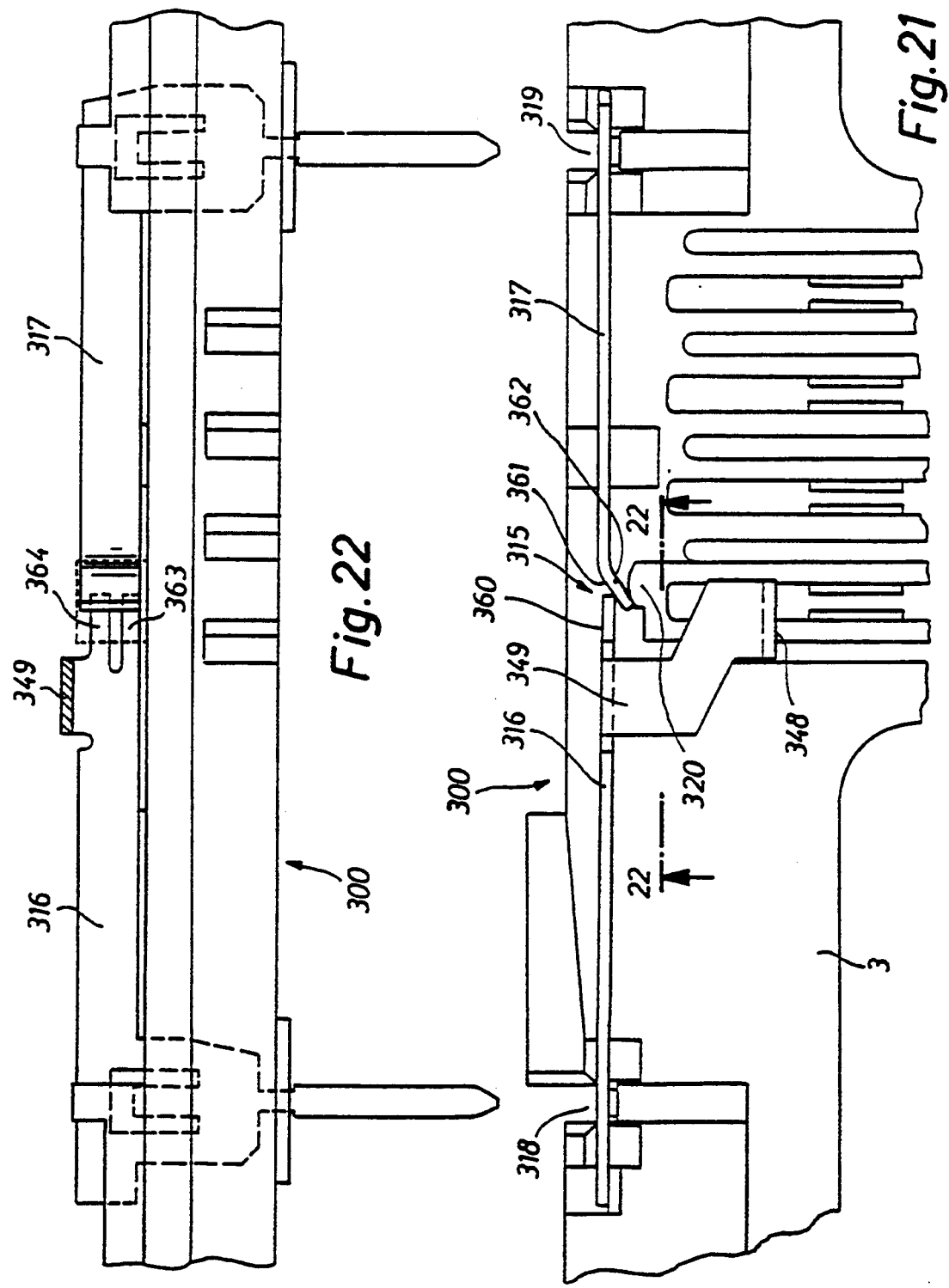

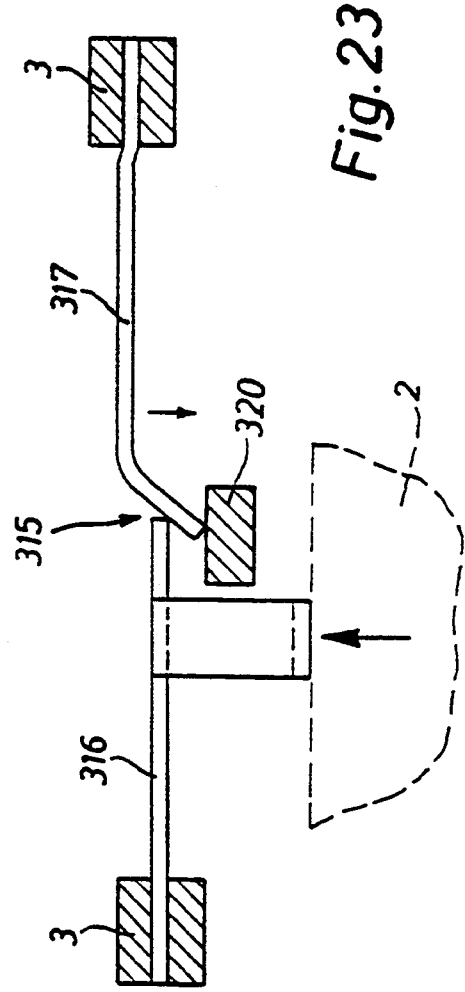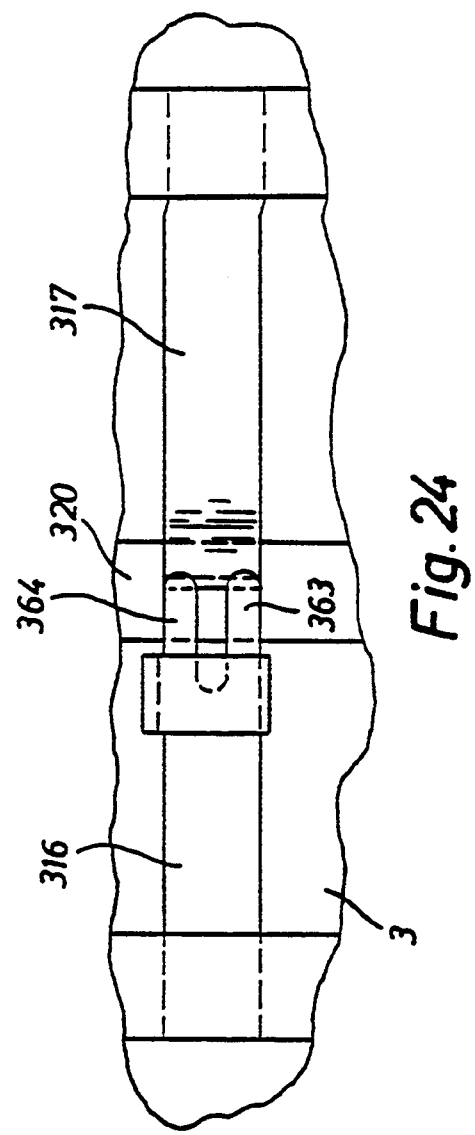

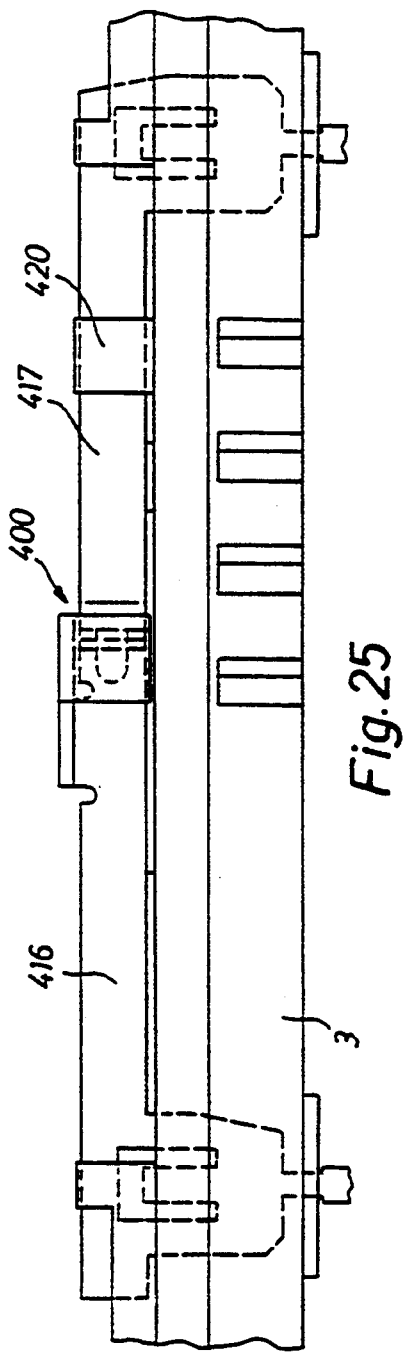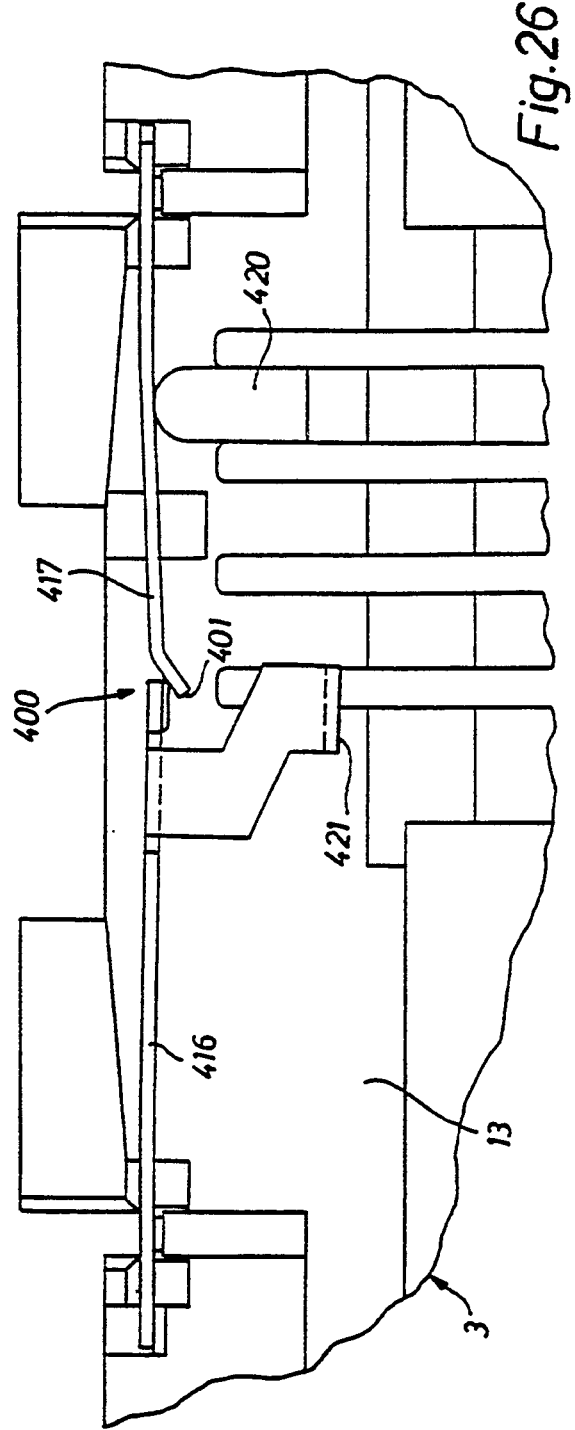

CHIP CARD READER WITH AN END POSITITION SWITCH

This application is a continuation of application Ser. No. 07/975,082, filed Nov. 12, 1992.

TECHNICAL FIELD

The invention relates to a chip card reader with an endposition switch. In general the invention relates to a chip card reader in which the chip card or a so-called key which incorporates a chip and contact elements similar to a chip card is insertable into a reading position. In the reading position the contact elements (reading contacts) in the chip card reader come in contact with the contact zones of the chip card (or the key).

BACKGROUND ART

In known chip card readers frequently a downward movement is provided between the chip card and the chip card reader when the chip card is inserted into the reading position so as to provide a good engagement between the contact elements of the chip card reader and the contact zones of the chip card. Such chip card readers require mechanical means to provide for said downward movement. For other applications a chip card reader might be sufficient which does not use such a downward movement but uses sliding contact elements so that said mechanical means for providing the downward movement for the chip card is no longer required. Examples for such chip card readers can be found in the following documents: EP 0 366 513 A1, U.S. Pat. No. 4,900,273 and DE-A 39 31 506.

Chip card readers of this type typically use a contact support constructed as a frame, and an endposition switch serves to indicate the arrival of the chip card in the reading position. The endposition switch is either closed or opened upon arrival of the reading position. An endposition switch which closes in the reading position is called a "closer" or closing means, while an endposition switch which opens in the reading position is called an "opener" or opening means.

It is an object of the present invention to provide a chip card reader without the downward mechanics wherein next to the reading contact in the frame of the chip card reader an endposition switch is positioned which can be designed in an easy manner both as an opener and a closer.

The endposition switch should also be designed in such a way that it can be positioned in the frame in an easy manner. Further, it should be possible to use only a minimum of switching contact elements regardless wether an opener or a closer is used. Further, an excellent contacting between the switching contact elements of the endposition switches is aimed for.

DISCLOSURE OF THE INVENTION

For solving the above object the invention provides for a chip card reader with a frame in which the reading contacts are preferably mounted by locking into place. According to the invention the endposition switch is formed by two switching contact elements, each of which is also mountable in the frame by locking into position. The design of the two switching contact elements is provided in such a way that these are each insertable both for realizing an opener and a closer.

According to the invention the frame is practically identical both while being used in connection with an opener and while being used in connection with a closer, and comprises in the case of a closer only an additional pin or abutment member, which is not necessary while realizing an opener. The frame further incorporates abutment means for the movable switching contact element which is preferably biased into its restposition. Preferably the abutment means are constructed in the form of a protrusion which protrudes from the contact surface of the frame.

It is also preferred that said movable switching contact element and the stationary switching contact element of the endposition switches are each biased into their resting positions.

Each of the switching contact elements is provided with a cylindrical cusp for increasing the Hertzian pressure so that two crossing cylinders are formed which ensures a good contact.

In accordance with another preferred embodiment of the invention, for improving the cleaning effect between the switching contact elements an increase in the normal force is provided by angling of one of the contact element springs. Further, one of the switching contact elements is preferably provided with at least two contact element legs, therefore making sure that the layer of foreign material is penetrated. Preferably the contact area of the passive or stationary contact element spring (switching contact element) is angled thereby increasing the normal force and the two switching contact elements (contact element spring) perform a minimal relative movement in the spring axis due to the resulting longitudinal force.

According to a preferred embodiment of the invention different chip card designs can be contacted since the endposition switch is not switched by the thickness of the card. It is for example possible to use the endposition switch according to the present invention in connection with a so-called key, i.e. a key-like structure with a larger thickness as a normal chip card. This key-like stucture supports contact zones corresponding to the contact zones of a chip card, which are being contacted by the reading contact elements after the endposition switch has been actuated.

A further embodiment of the invention provides, that again at least one of the two contact element springs of an endposition switch is angled. That means, that the contact element end of one of the contact element springs lies on an angled end of the other contact element spring. According to the preferred embodiment of the invention it is the contact element spring with the angled contact element end which is biased against an abutment member; said abutment member is not located under the angled contact element end of the contact element spring but which is offset towards the fixedly mounted end of the contact element spring. Preferably, the abutment member is located at about the middle of said contact element spring. The abutment member can also be located relatively close to the—free—contact element end of said contact element spring or relatively close to the fixing or mounting position of said contact element spring. Due to this arrangement it is achieved, that the contact element spring which is actuatable (active) by the card lies in the closed position of the endposition switch on the angled surface of said first (passive) contact element spring. Preferably the contact element spring which is actuatable by the card is biased into the closed position of the endposition switch so hard against the free end of the passive contact element spring, that it is somewhat moved out of its restposition which is otherwise determined by biasing, whereby the self-cleaning force of the endposition switch is improved.

BRIEF DESCRIPTION OF THE DRAWINGS

Further advantages, objects and details of the invention can be gathered from in the description of embodiments in connection with the drawings.

FIG. 1A is a plan view of the frame of a chip card reader according to the invention with the cover being removed and with an endposition switch which can be called a closer according to the present invention;

FIG. 1B is an enlarged detail of the endposition switch according to FIG. 1A;

FIG. 4 is a view similar to FIG. 3 wherein the opener is shown in its switched condition;

FIG. 11 is a plan view of the movable switching contact element after separating from the pilot strip and before the forming shown in FIGS. 12 to 15;

FIG. 16 is a plan view of the stationary switching contact element after separating from the pilot strip and before the forming according to FIGS. 17 to 20;

FIG. 21 is a representation similar to FIG. 3 wherein the switching contact elements are used in a similar way as in FIG. 3 but this time with an angled position of one of the two contact areas;

FIG. 22 is a sectional view along line 22—22 in FIG. 21;

FIG. 23 is a schematic representation of the arrangement according to FIG. 21; and FIG. 24 is a schematic plan view of the arrangement according to FIG. 23;

FIG. 25 is a schematic side view of a chip card reader with a further embodiment of the endposition switch;

FIG. 26 is a plan view of the representation of FIG. 25 with the endposition switch;

BEST MODE FOR CARRYING OUT THE INVENTION

Figure 5:
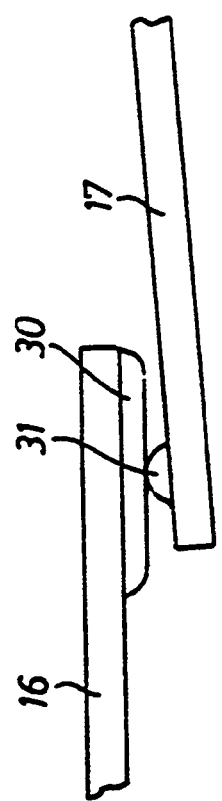
FIG. 5 is an enlarged schematic side view of the switching parts of both switching contact elements.
Figure 6:
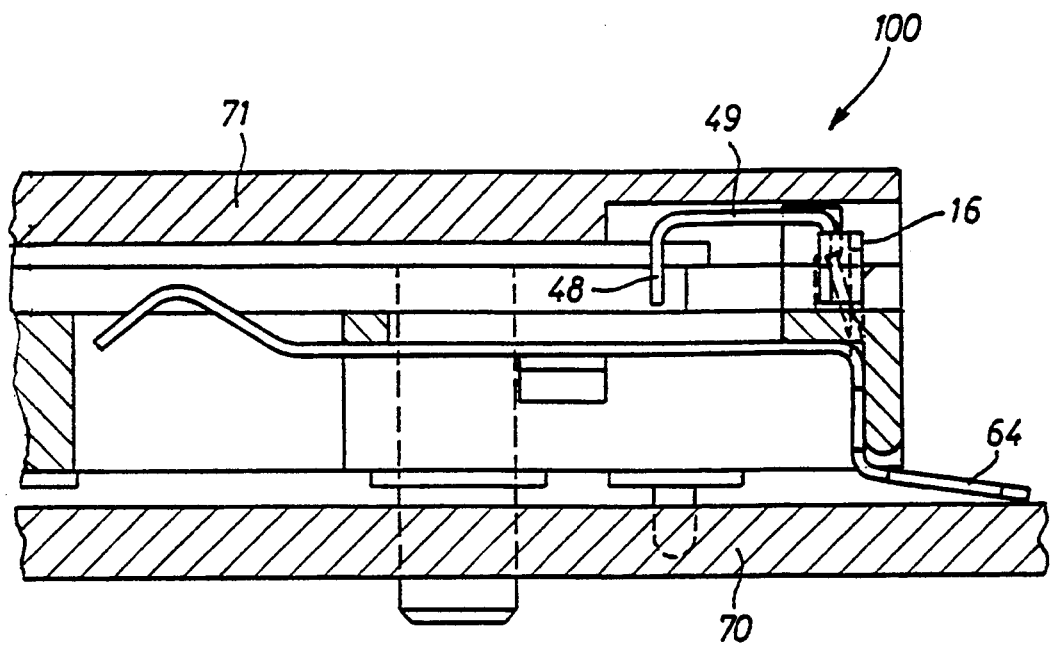
FIG. 6 is a partial sectional view of a chip card reader according to the invention with a not switched opener.
Figure 7:
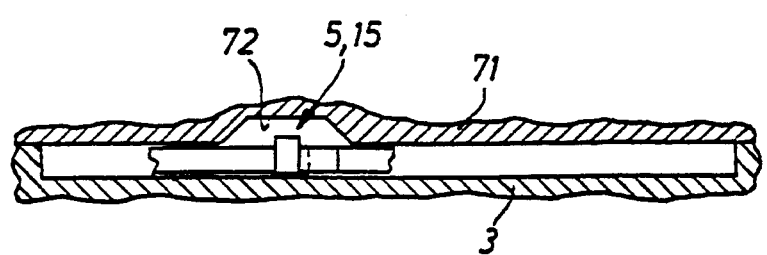
FIG. 7 is a schematic sectional view of a chip card reader according to the present invention for showing better the actuation possibilities of an endposition switch according to the present invention by means of a normal chip card as well as by means of a so-called "key"

Referring to FIGS. 1A, 1B, 2A and 2B a first embodiment of the invention is explained. Referring to FIGS. 3, 4 and 6 a second embodiment of the invention is explained. FIG. 5 shows a design which is useful for both embodiments, and FIG. 7 shows that the invention can also be used with keys. FIGS. 8 to 20 show the preferred design of the switching contact elements of the endposition switch according to the present invention.

FIGS. 1A, 1B, 2A and 2B show a chip card reader 1, which serves to contact a chip card 2. Each chip card reader 1 comprises a frame 3 in which openings 4 for reading contact elements are shown. An endposition switch 5 according to the present invention is designed as a so-called "closer" or closing means. The closing means are moved from the opening position shown in FIGS. 1A and 1B to their closing position shown in FIGS. 2A and 2B by moving the card 2 into its reading position.

The endposition switch 5 comprises a movable switching contact element 6 and a stationary switching contact element 7. The switching contact element 6 is locked and thus secured by means which will be described below in more detail. Especially, a locking or detent element (tongue) 47 which locks with a locking or detent recess 8 formed in the frame 3. In a similar manner the static switching contact element 7 is secured in a locking recess 9 in the frame 3 by means of a locking element (tongue) 66.

In its assembled condition the movable switching contact element 6 is biased against an abutment member 10 which extends from the plane formed by the card support surface 13. Also the static switching contact element 7 is biased into its restposition preferably against an abutment means preferably in the form of a pin 11. The pin 11 also extends like the abutment member 10 from the card support surface. Both abutment member 10 and pin 11 are preferably manufactured together with the frame 3 by means of injection molding.

Figure 2A:
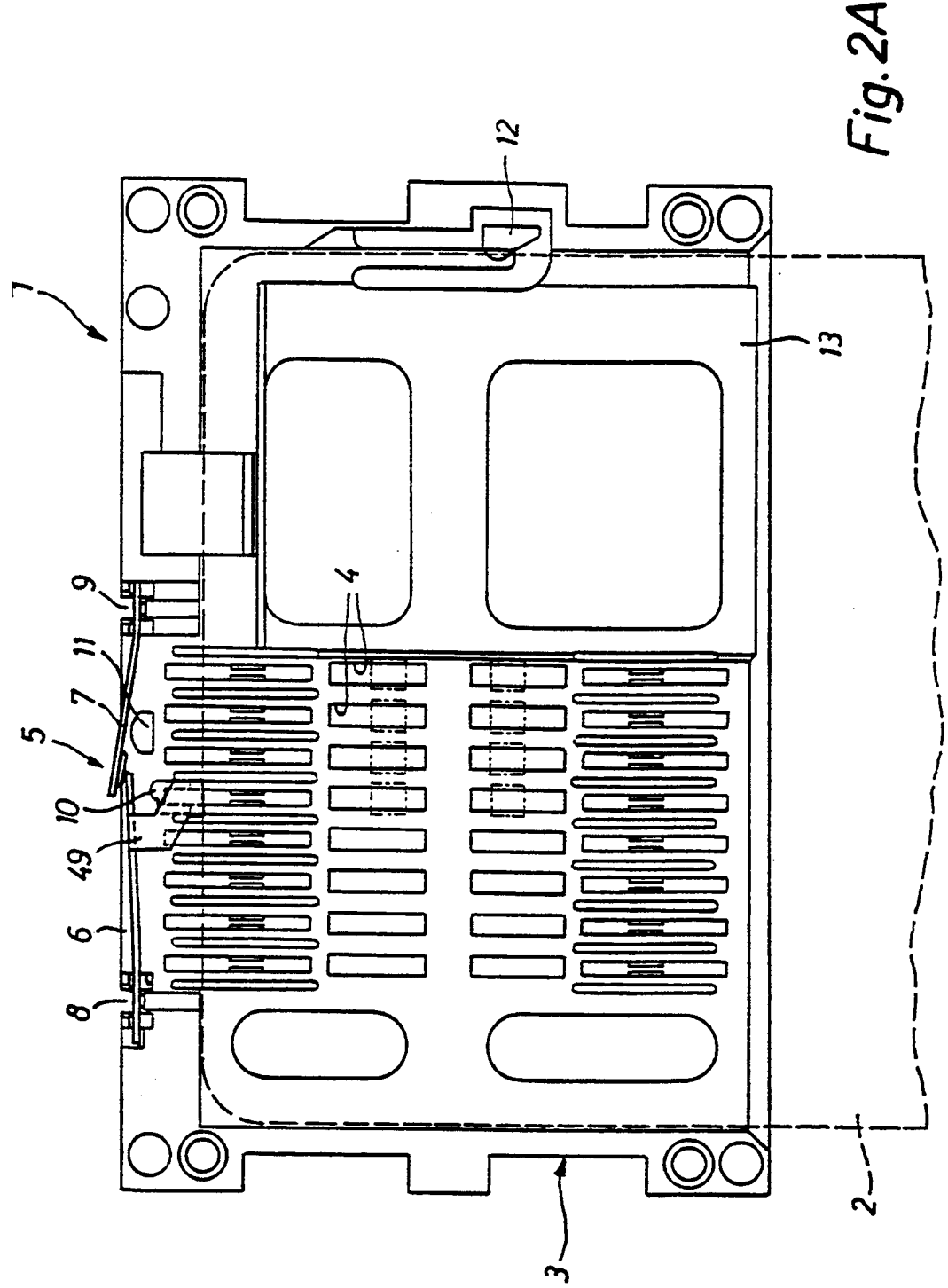
FIG. 2A is a plan view similar to FIG. 1A wherein now the closer is switched i.e. the chipcard is in its reading position.
Figure 2B:
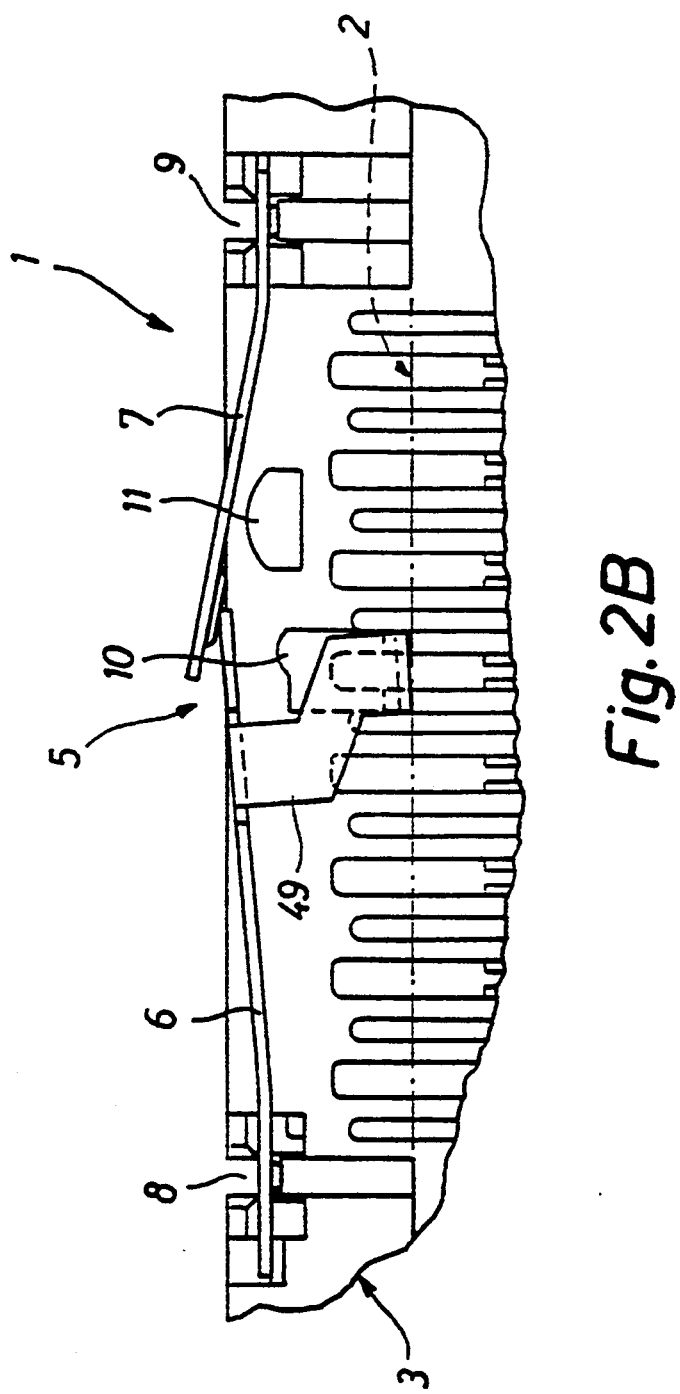
FIG. 2B is an enlarged detail of the endposition switch according to FIG. 2A.
Figure 3:
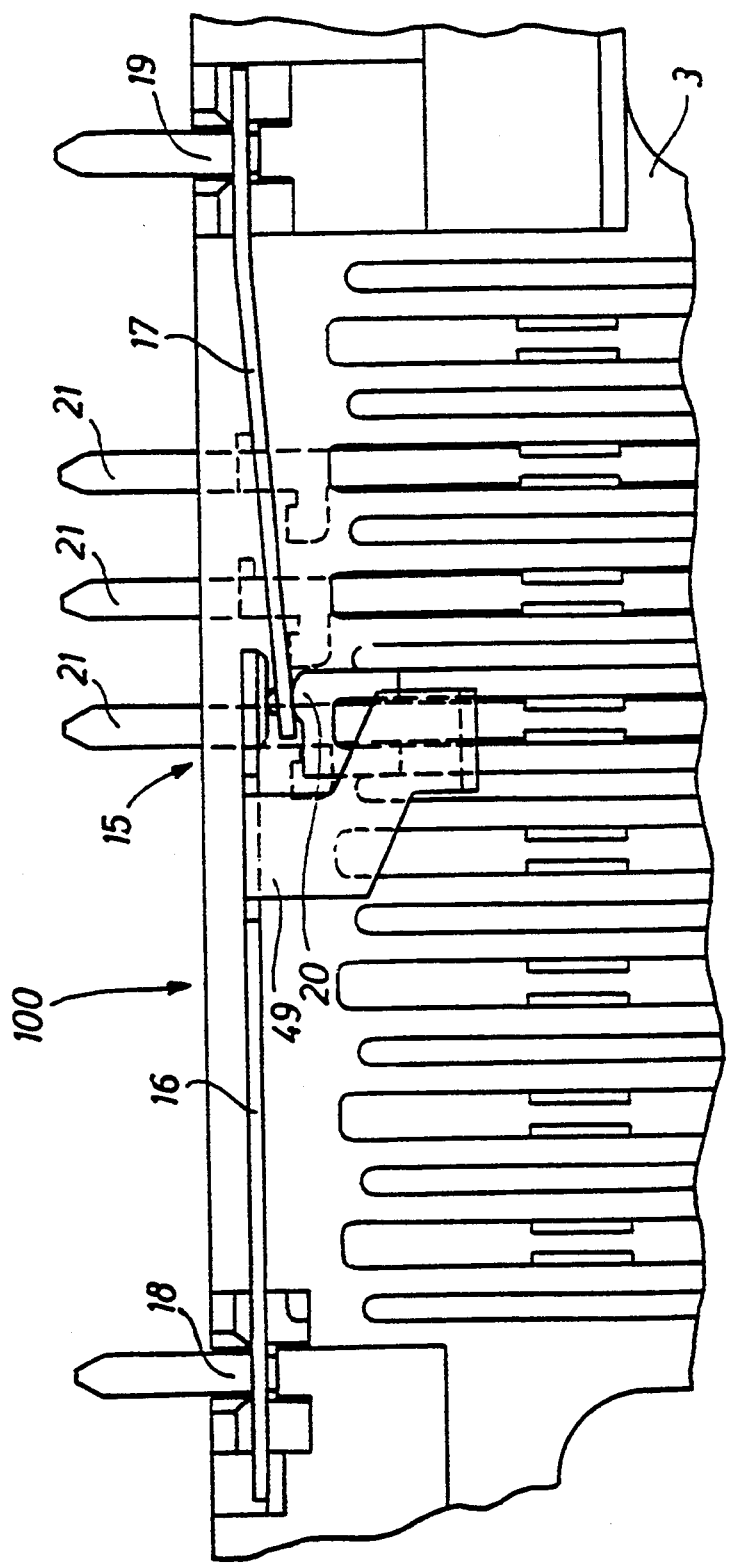
FIG. 3 is a plan view of a part of the frame of a chip card reader with an endposition switch being designed as an opener which is shown in its unswitched condition.

It can easily be seen that upon insertion of the chip card 2 finally—compare FIG. 1A—the movable switching contact element 6 will be contacted and as shown in FIGS. 2A and 2B will be moved into contact with the stationary switching contact element 7. It can be seen that the so-called stationary switching contact element 7 is not completely stationary but as is shown in FIG. 2B in the case of the contacting with the movable switching contact element 6 can be flexibly lifted of the pin 11.

The frame 3 further forms according to the present invention a centering and brake lever 12 which pushes from the side onto the chip card and thus eliminates guide tolerances in the card guide means and at the same time exerts a braking effect on the card without influencing the contact force in a positive or negative manner.

FIGS. 3, 4 and 6 show a chip card reader 100 which largely corresponds to the chip card reader 1. The frame 3 of the chip card reader 100 corresponds to the frame 3 of the chip card reader 1 with the only exception, that in the embodiment according to FIGS. 3, 4 and 6 there is no pin 11.

The endposition switch 15 is formed as a so-called opener or opening means, i.e. upon actuation by the card 2 the endposition switch opens.

According to the invention the endposition switch 15 comprises a movable switching contact element 16 and a stationary switching contact element 17 which are fixed like the contact elements 6 and 7 by locking into respective locking recesses 18 and 19 of the frame 3, by detent means.

The abutment member 20 corresponds to the abutment member 10 wherein according to FIGS. 3 and 4 the actually stationary switching contact element 17 is preferably resiliently biased against the abutment member 20.

Different to the first embodiment the endposition switch 15 is formed as a so-called opener or opening means. i.e. on insertion of the card the contact between the movable switching contact element 16 and the stationary switching contact element 17 is opened.

As can be seen in FIG. 3 in the closing position of the endposition switch 15 the stationary switching contact element 17 is biased against the abutment member 20 and the movable switching contact element 16 is also biased towards the abutment member 20 and abuts the stationary contact element. FIGS. 3 and 4 also show the arrangement of reading contact elements 21.

According to the present invention the movable contact elements 6 and 16 and also the stationary contact elements 7 and 17 are formed identically so that a closer and an opener can be formed respectively with the same contact elements.

With the preferred use of cylindrical projections or cusps which preferably cross in their arrangement, the projections have to be opposite to the ones shown in FIG. 5 for the case of a closer. FIG. 5 shows a cusp 30 formed as a cylinder on the movable switching contact element 16 which runs in a longitudinal direction of the switching contact element 16. Switching contact element 17 however shows a cusp 31 which runs transverse to the longitudinal direction of the switching contact element 17 which also has the form of a cylinder.

FIG. 6 shows the chip card reader 100 mounted on a printed circuit board 70 wherein a soldering termination 64 can be seen which will be described in more detail below. Also, a cover 71 is shown.

FIG. 7 shows schematically that the endposition switch 5, 15 according to the present invention is actuable both by a normal card 2 and a so-called key, which also has a larger thickness which requires a recess 72 in the cover 71.

Figure 8:
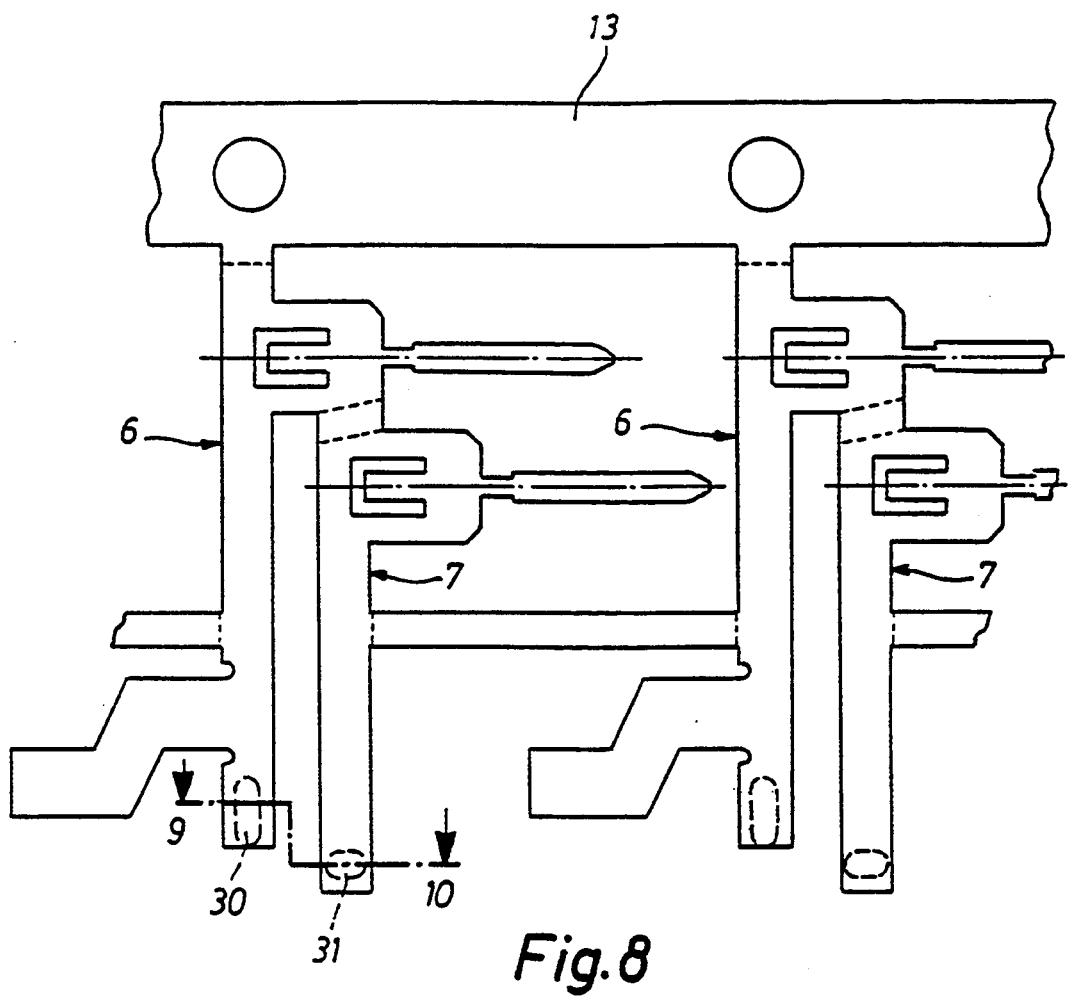
FIG. 8 is a plan view of a part of a stamp or pilot strip which holds the movable and static switching contact element of the endposition switch in their original condition.
Figure 9:
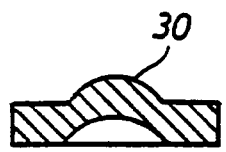
FIGS. 9 and 10 are sectional views along line 9-10 in FIG. 8.
Figure 10:
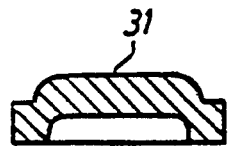

FIG. 8 shows the switching contact elements 6, 16, 7, 17 after stamping still being connected to a pilot strip 13. FIGS. 9 and 10 show in detail the form of the cylindrical cusps 30, 31.

FIGS. 11 to 15 show the movable switching contact element 6 and 16 respectively during different manufacturing steps and in different representations. The switching contact elements 6 and 16 respectively comprise a locking or detent portion (locking portion) 40 and an actuation and switching portion (switching portion) 41, which are connected by a strip-like connecting portion 42. A soldering termination 44 can be formed for the SMD technique.

The locking portion 40 has a cut-out portion 45 for forming a locking means (tongue) 46, which has the form as shown in FIG. 15. The locking portion 40 also has guide surfaces for the insertion in the recess of the frame. The switching portion 41 has an abutment angle with a card abutment member 48 which is formed on the angled arm 49. Further, a contact arm 50 is provided which comprises said cusp 30.

FIGS. 16 to 20 show the stationary switching contact element 7, 17 in its different manufacturing steps. A locking or detent portion 60 is connected to an actuation and switching portion 61 via a connecting portion 62. The locking portion 60 has a similar form to the locking portion 40 and comprises a locking means (tongue) 66 which is surrounded by a cut-out portion 45. A soldering termination 64 is also provided. The termination 64 can be formed in any desired manner similar to termination 44. Further, in FIG. 19 the forming of the cusp 31 in the switching portion 61 can be seen.

FIGS. 21 to 24 show a chip card reader 300 which largely corresponds to a chip card reader 3 according to FIG. 3.

The endposition switch 315 is formed as a so-called opener i.e. upon actuation by the card 2 the endposition switch 315 opens. The design as a closer is also possible with the principles according to the present invention.

According to the present invention the endposition switch 315 comprises a movable switching contact element 316 and a stationary switching contact element 317 which, like the contact elements 16 and 17 according to FIG. 3, are secured by locking of respective locking recesses 318 and 319 of the frame 3.

The abutment member 320 corresponds to abutment member 20. Like in FIG. 3 and 4 the stationary switching contact element 317 is preferably resiliently biased against abutment member 320.

The endposition switch 315 is formed as a so-called opener like in the embodiment according to FIG. 3 i.e. upon insertion of the card 2 the contact between the movable switching contact element 316 and the stationary switching contact element 317 is opened.

As can be seen in FIG. 21 in the closing position of the endposition switch 315 the stationary switching contact element 317 is biased against abutment member 320 and the latter movable switching contact element 316 is biased towards abutment member 320 wherein the switching contact element 316 lies on the stationary contact element.

The switching contact element 316 according to FIGS. 21 to 24 comprises the same basic structure as the movable contact element 42 according to FIG. 14. Especially the switching contact 316 is provided with an angled arm 349 and a card abutment member 348 disposed thereon. Different to the embodiment according to FIG. 4 the end 360 of the switching contact element 316 and also 317 is not provided with a cusp but compared to the switching contact element 16 the switching contact element 316 is somewhat shortened and abuts with its end portion 360 at an inclined or angled surface 361 which is formed by the end portion 362 of the switching contact element 317. The endportion 362 is as shown angled relative to the bigger portion of the switching contact element 317.

Preferably the endportion 360 forms two legs (compare FIGS. 23 and 24) 363, 364. The legs can preferably (compare FIG. 24) be rounded on their ends which are in contact with the angled surface 361.

As mentioned above the switching contact element 317 in the form of a contact element spring is biased against the abutment 320 and can be seen as a passive switching contact element. Also the switching contact element in the form of the contact element spring 316 is biased and lies on the angle surface 361.

Especially by choosing the biasing force for the switching contact element 316 the arrangement is such, that on the contact locations between the front end 360 and the inclined contact surface 361 a relative movement occurs during switching so that dirt or dust within the area of the contact is removed. Even though the contact element spring 317 is generally called passive or immovable it is possible to perform sufficient relative movement relative to the contact spring 316.

Figure 27:
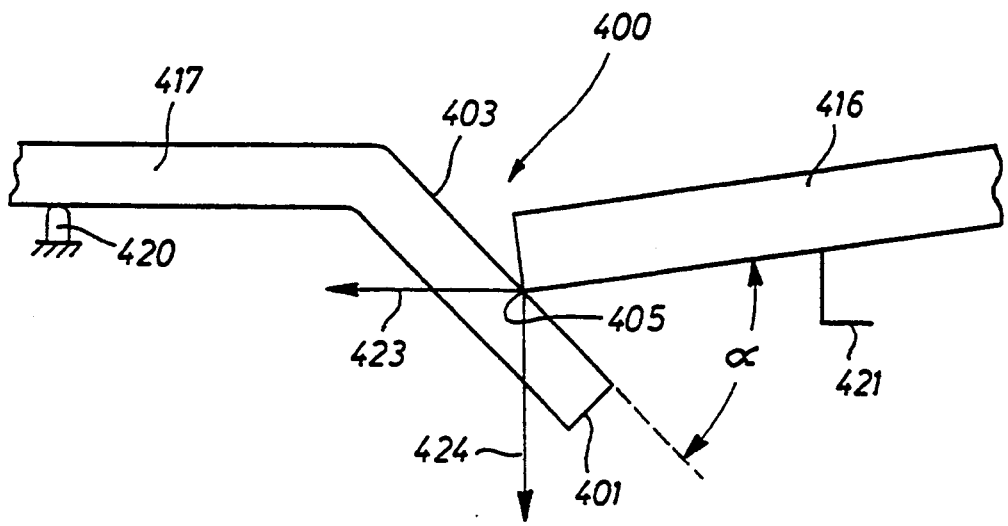
FIG. 27 is a schematic representation of the principles underlying the endposition switch according to FIG. 26.

Referring to FIGS. 25 to 27 a further embodiment of the invention is described, with an endposition switch in the form of a so-called opener. The endposition switch 400 according to FIGS. 25 to 27 comprises-two switching contact elements in the form of contact element springs 416 and 417 each being secured on one end in the frame 13 preferably by locking (detent action). The open (active) contact element spring 416 is movable from the shown closing position in an opening position by a chip card.

The main difference between the construction according to FIG. 25 to 27 and the construction according to FIGS. 23 and 24 is, that the abutment member 21 according to FIGS. 23 and 24 in the form of an abutment member 420 is moved from the free end of the contact element spring closer to the fixed position of the contact element spring. The passive contact element spring 417 is biased against the abutment member 420 which is preferably formed on the frame 3. The abutment member 420 is approximately centered between the free end 401 of the contact element spring 417 and the fixed location 402 of the contact element spring 417. The abutment member 420 preferably takes the position as shown in FIG. 26 but can also be moved towards the right closer to the fixed position 402 as well as to the left towards the free end 401 of the contact element spring.

In the closing position of the end position switch 400 (as shown in FIG. 26) the contact element spring 416 is preferably biased against the inclined surface 403 of the contact element spring 417 such that the free end 401 of the passive spring 417 is somewhat pushed downwards relative to the position in which the spring 417 would be located due to its biasing without the contact element spring 416. It follows, that upon actuation of the contact element spring 416 by the chip card the contact element spring 417 would initially follow the upward movement (FIG. 26) of contact element spring 416 before it lifts off the inclined surface 403. This assists together with said inclined surface and the relatively sharp engagement edge 405 of the contact element spring 46 the cleaning effect between the two contact element springs so that even after a longer period of time a safe contact is given.

Preferably the engagement angle α (alpha) between the preferably as a whole straight contact element spring 416 and the inclined surface 403 of the otherwise preferably straight contact element spring 417 is about 45°. Preferred is also the range between 20 to 60 degrees.

In FIGS. 25 to 28 the abutment member for the chip card has the reference sign 421. The reference signs 423, 424, 425 shown schematically the effect of force.

Since the passive contact element 417 also called rest contact element is biased in the above manner, due to the abutment member 420 moving closer to the fixed position 402 a larger relative movement is obtained between the contact element spring 416 and the contact element spring 417 thereby a better contact and a larger contact force is obtained. Further, even after a longer time period, it can be securely switched.

It is important to note that the two contact element springs 416, 417 preferably extend to opposite sides but run substantially on one line forming the inclined surface 403 for attaining the desired contact element cleaning forces.

Figure 28:
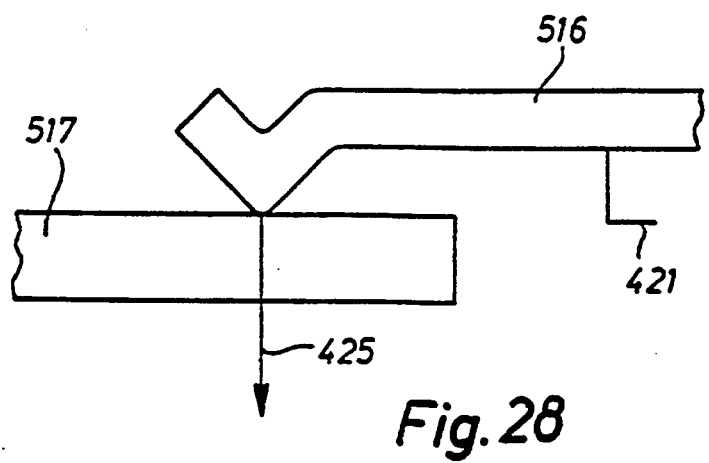
FIG. 28 schematically shows an endposition switch according to the prior art.

FIG. 28 shows schematically a known end position switch with two contact element springs 516 and 517 wherein the spring 517 is not biased against an abutment member, but it is pushed downwards in the resting position of the endcontact by the contact element spring 516 which is loaded downwardly but not biased. Especially also due to the missing inclined surface between the two contact element springs 516 and 517 in the area of the contact less favourable condition occur as in the embodiment according to FIG. 27. To sum up it can be said that in the embodiment according to the FIGS. 25 to 27 for obtaining a relative movement of the contact element springs 416, 417 it is provided to move the abutment member 420 of the passive spring 417 to the fixed position 402. The realization of the free spring arm due to the contact force of the active spring 416 causes a desired sliding path. As a result a larger relative movement which for example is at least within the area of 0.2 mm is achieved. Further, a larger normal force results, without increasing the contact force of the card. Further, a spot contact instead of an area contact is provided. In the construction according to FIGS. 23 and 24 preferably two legs 363, 364 are provided in the construction according to FIGS. 25 to 27 preferably only one contact element finger for the active contact element 416 is provided.

Figure 29A:
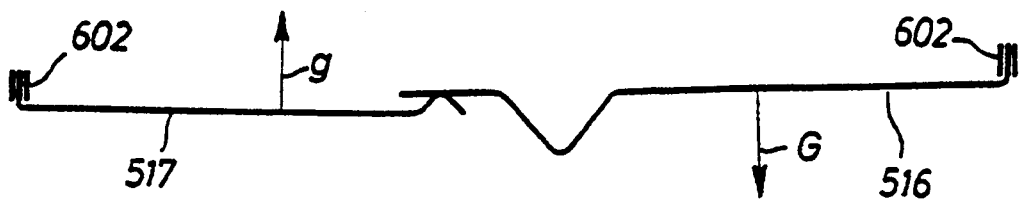
FIG. 29A–29C are comparisons of known endposition switches with an endposition switch according to the present invention.
Figure 29B:
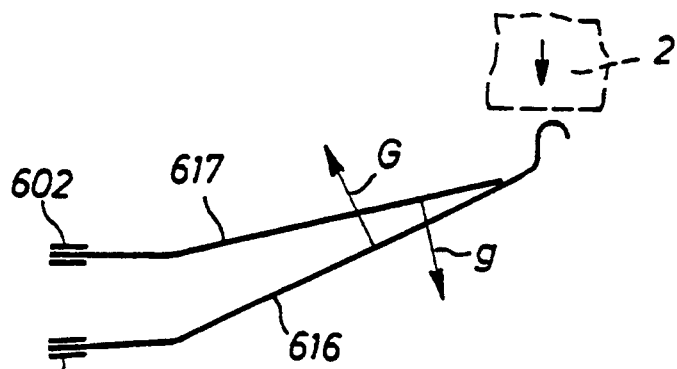
Figure 29C:
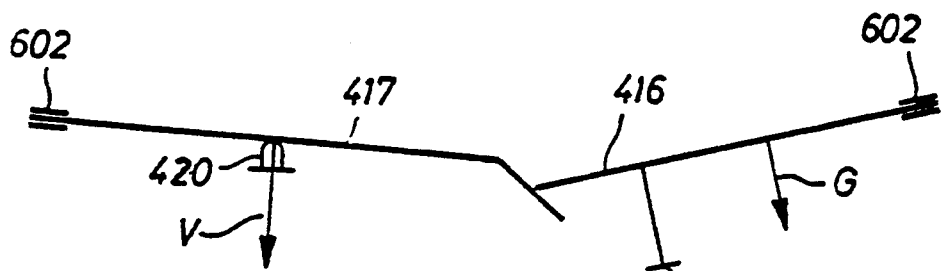

FIGS. 29A, 29B and 29C show in more detail in FIG. 29A schematically the prior art according to FIG. 28, in FIGS. 29B an also known endposition switch and in FIG. 29C the endposition switch according to the present invention of FIG. 27.

The mounting position of the contact element springs is each denoted by the reference signs 602. In the arrangement of FIG. 29A it is denoted by the letter G, that the contact element spring 516 has moved the contact element spring 517 in the shown closed position against a smaller force of the spring 517 which is denoted by the letter g. In the shown closed position naturally, the forces of the contact element springs 516 and 517 exerted on each other are zero. If however the chip card moves the contact element spring 516 (upward) the contact element spring 517 follows initially this movement until the contact element spring 517 reaches its no longer loaded position. In the design according to FIG. 29B both contact element springs 616 and 617 are arranged in such a manner, that the shown closing position is achieved in that the contact element spring 617 initially has a larger force G which biasses the contact element spring 617 into the shown position, until the forces exerted onto each other by the contact element springs 617 and 616 balance each other. Thus the contact element spring 617 exerts initially no force or only a smaller force than the force G downward which is schematically denoted g in FIG. 29B. Due to this arrangement upon downward movement of the contact element spring 616 by the card 2, the upper contact element spring 617 initially follows said movement and slide along the contact element 616 until the loading force of the contact element spring 617 is depleted and only the contact element spring 617 is moved further by the card 2 and is thus further loaded which however causes the opening of the endposition switch.

With the endposition switch according to the present invention of FIG. 29C the so-called passive contact element spring 417 is biased with a force V against the abutment member 420. Further, the contact element spring 416 exerts initially i.e. before reaching the shown closing position a larger force G on the inclined surface of the contact element spring 417 and biases the contact element spring 417 somewhat downwards round the abutment member, so that the contact element spring 417 together with its inclined surface is moved downwards until the resulting reaction force is equal to the force exerted by the contact element spring 416. The result is, that when a card abuts the card abutment member 421 the contact element spring 416 is moved upwards against its load force wherein initially the inclined surface of the contact element spring 417 follows the front end of the contact element spring 416 until the contact element spring 416 gets away from this inclined surface. During this initial following movement of the inclined surface of the contact element spring 417 a good contact between the free end of the contact element spring 416 and the inclined surface of the contact element spring 417 is achieved. Due to this fact layers of a foreign matter are penetrated and a contact element cleaning effect is obtained. Especially, also a wedging effect occurs between the free end of the contact element spring 416 and the inclined surface when the contact element spring 416 impacts on the inclined surface of the contact element spring 417, wherein an increasing increase of the contact force occurs which leads to contact cleaning and also to a good contact. Especially the wedging effect of the latter case which leads to a good contact is of special importance in practical applications since the endposition switch of FIG. 29C could be opened over a longer time period when the card is inserted wherein it is especially important that then, when the card is taken out after this longer time period a safe closing of the endposition switch is achieved. Chip card reader wherein the switching portion (41) of the movable switching contact element is fork-like, forming a contact arm (50), and spaced therefrom a preferably angled arm (49), which in turn forms an abutment angle for forming of a card abutment (48).

We claim:

1. Chip card reader, comprising:
   a frame in which reading contact elements and an end position switch are provided, said end position switch comprising means including two switching contact elements for indicating the reaching of a reading position by a chip card,
   wherein one of said switching contact elements is a movable switching contact element and the other of said switching contact elements is a static switching contact element, wherein both said switching contact elements comprise locking means adapted to be locked in the frame for mounting the switching contact elements in the frame, and wherein both switching contact elements are biased into rest positions in which said contact elements contact each other,
   wherein said static switching contact element consists of a straight portion extending from said locking means and an inclined portion extending from said straight portion at a non-zero angle relative to the straight portion, and wherein the movable switching contact element is substantially straight and extends from said locking means to a tip which contacts said inclined portion at a contact area such that upon switching a relative wiping movement between said tip and said inclined portion occurs.

2. Chip card reader according to claim 1, wherein the static switching contact element is biased against an abutment member and wherein the movable switching contact element is biased against the inclined portion.

3. Chip card reader according to claim 1, wherein the tip of the movable contact element includes two legs.

4. Chip card reader comprising
   a frame on which an end position switch is mounted, where said end position switch comprises two switching contact elements in the form of an active contact element spring arranged to be moved by insertion of a chip card and a passive contact element spring, said active contact element spring having a tip at a free end thereof,
   wherein the passive contact element spring is biased against an abutment member which lies between a free end of the passive contact element spring and a fixed portion of the passive contact element spring, and
   wherein the passive contact element spring consists of a fixed portion, from which extends a straight portion, from which extends an inclined portion which further forms an inclined surface at a point of contact between the passive contact element and the tip of the active contact element spring.

5. Chip card reader according to claim 4, wherein said contact element springs are substantially collinear and extend in opposite directions from the contact point.

6. Chip card reader according to claim 4, wherein an angle $\alpha$ (alpha) between the free end of the active contact element spring and the inclined surface of the passive contact element spring has a range of between 10 and 90 degrees.

7. Chip card reader according to claim 6, wherein the angle $\alpha$ (alpha) has a range of between 20 to 70 degrees.

8. Chip card reader according to claim 6, wherein the angle $\alpha$ (alpha) is approximately 45 degrees.

9. Chip card reader according to claim 4, wherein the tip of the active contact element spring is arranged to abut the inclined surface in the closed position of the end position switch in such a manner that the passive contact element spring is additionally loaded in the direction of the biasing force due to the force effect of the active contact element spring so that upon opening of the end position switch, the inclined surface together with the passive contact element spring initially follows the opening movement of the active contact element spring.

* * * * *